(12) United States Patent
Callegari et al.

(10) Patent No.: US 9,470,743 B2
(45) Date of Patent: Oct. 18, 2016

(54) DYNAMIC YIELD PREDICTION

(71) Applicant: NVIDIA Corporation, Santa Clara, CA (US)

(72) Inventors: Nicholas Callegari, Belmont, CA (US); Bruce Cory, Aptos, CA (US); Joe Greco, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 41 days.

(21) Appl. No.: 14/196,219

(22) Filed: Mar. 4, 2014

(65) Prior Publication Data

US 2015/0253373 A1   Sep. 10, 2015

(51) Int. Cl.
  *G06F 17/50* (2006.01)
  *G01R 31/26* (2014.01)
  *H01L 21/66* (2006.01)

(52) U.S. Cl.
  CPC ....... *G01R 31/2601* (2013.01); *G06F 17/5081* (2013.01); *H01L 22/14* (2013.01); *H01L 22/20* (2013.01); *G06F 17/504* (2013.01); *G06F 2217/12* (2013.01); *G06F 2217/14* (2013.01)

(58) Field of Classification Search
  None
  See application file for complete search history.

(56) References Cited

U.S. PATENT DOCUMENTS

| | | | | |
|---|---|---|---|---|
| 5,497,381 A * | 3/1996 | O'Donoghue | ........ | H01L 22/20 257/E21.525 |
| 6,929,962 B1 * | 8/2005 | Chang | ........ | G01R 31/2894 438/10 |
| 7,111,257 B2 * | 9/2006 | Robson | ........ | G01R 31/2884 438/18 |
| 7,240,306 B2 * | 7/2007 | Allen | ........ | G06F 17/5081 382/149 |
| 7,496,478 B2 * | 2/2009 | Rathei | ........ | G05B 19/41875 700/121 |
| 7,650,199 B1 * | 1/2010 | Kadosh | ........ | G05B 19/41865 700/121 |
| 7,974,723 B2 * | 7/2011 | Moyne | ........ | G05B 19/41865 700/101 |
| 8,082,055 B2 * | 12/2011 | Lin | ........ | G06Q 10/06 700/103 |
| 8,219,341 B2 * | 7/2012 | Tsen | ........ | H01L 22/20 324/759.01 |
| 8,452,439 B2 * | 5/2013 | Wu | ........ | H01L 22/14 700/104 |
| 8,775,112 B2 | 7/2014 | Van Dyke et al. | | |
| 8,805,630 B2 * | 8/2014 | Lin | ........ | H01L 22/20 438/14 |
| 8,962,353 B2 * | 2/2015 | Wang | ........ | H01L 22/12 257/E21.521 |
| 9,063,097 B2 * | 6/2015 | Ong | ........ | G01N 21/956 |
| 9,277,186 B2 * | 3/2016 | Yong | ........ | H04N 7/18 |
| 9,336,107 B2 * | 5/2016 | Tang | ........ | G06F 11/26 |
| 2006/0190224 A1 | 8/2006 | Allen et al. | | |
| 2008/0140590 A1 * | 6/2008 | Shen | ........ | G05B 19/41875 706/12 |
| 2008/0275586 A1 * | 11/2008 | Ko | ........ | G05B 23/0221 700/110 |
| 2009/0157362 A1 * | 6/2009 | Wu | ........ | G06F 17/5036 703/7 |
| 2012/0079439 A1 | 3/2012 | Akar et al. | | |
| 2012/0207381 A1 | 8/2012 | Ong et al. | | |
| 2013/0145213 A1 | 6/2013 | Tang et al. | | |
| 2013/0182101 A1 | 7/2013 | Yong et al. | | |

OTHER PUBLICATIONS

Chen et al., "Wafer Die Yield prediction by Heuristic Methods," 2010 4th Internat'l Conference on Computers and Industrial Engineering (CIE), pp. 1-4.*

(Continued)

*Primary Examiner* — Leigh Garbowski

(57) ABSTRACT

Dynamic yield prediction. In accordance with a first method embodiment of the present invention, a computer-implemented method includes collecting sample test information from a plurality of test-only structures prior to completion of the first wafer, gathering finished test data from all die of the first wafer, after completion of the first wafer, constructing a yield prediction model based on the sample test information and on the finished test data, and predicting, using the model, a percentage of die of the first wafer that will meet a particular specification. The method may further include a feedback loop to dynamically update the model.

20 Claims, 3 Drawing Sheets

(56) References Cited

OTHER PUBLICATIONS

Chung et al., "One Methods to Real-time Control Tool PM Effect and Predict WAT output," 3-Manufacturing & Design Collaboration Symposium 2012, pp. 1-2.*

Semiconductor Front End and Back End Applications. Advanced Motion Controls. http://www.a-m-c.com/successes/industry_highlight/semiconductor/ Downloaded on Dec. 22, 2015.
Production. Infineon Technologies. http://www.infineon.com/cms/en/careers/why-us/functional-areas/production/ Downloaded Dec. 22, 2015.

* cited by examiner

200

$$\mathbf{X} = \begin{bmatrix} \vec{x}_1 & \vec{x}_2 & \cdots & \vec{x}_m \end{bmatrix} = \begin{bmatrix} x_{11} & x_{21} & \cdots & x_{m1} \\ x_{12} & x_{22} & \cdots & x_{m2} \\ \vdots & \vdots & \vdots & \vdots \\ x_{1n} & x_{2n} & \cdots & x_{mn} \end{bmatrix} \quad \vec{y} = \begin{bmatrix} y_1 & y_2 & \cdots & y_m \end{bmatrix}$$

Fig. 2

DYNAMIC YIELD PREDICTION

FIELD OF INVENTION

Embodiments of the present invention relate to the field of semiconductor manufacturing and test. More specifically, embodiments of the present invention relate to systems and methods for dynamic yield prediction.

BACKGROUND

Conventional art methods of predicting a yield of a semiconductor manufacturing process generally involve testing a small number of the first wafers produced and mapping their yield to subsequent production. For example, 40% of finished die on the first wafers met a set of specifications, and thus 40% of all die on all wafers are predicted to meet those specifications.

Unfortunately, such conventional methods generally do not account for process target drift, and/or changes in process variation. In addition, such first wafers often are not representative of an entire manufacturing population. Thus, tested parameters must be forced into an assumed distribution, e.g., a normal distribution, to predict manufacturing yield. Such an assumed distribution, based on limited sampling, may not reflect a distribution of a larger manufacturing population.

SUMMARY OF THE INVENTION

Therefore, what is needed are systems and methods for dynamic yield prediction(s). What is additionally needed are systems and methods for dynamic yield predictions that account for process target drift, and/or changes in process variation. A further need exists for systems and methods for dynamic yield predictions that are compatible and complementary with existing systems and methods of electronic device design, manufacture and test. Embodiments of the present invention provide these advantages.

In accordance with a first method embodiment of the present invention, a computer-implemented method includes collecting sample test information from a plurality of test-only structures of a first wafer, prior to completion of the first wafer, gathering finished test data from all die of the first wafer, after completion of the first wafer, constructing a yield prediction model based on the sample test information and on the finished test data, and predicting, using the model, a percentage of die of the first wafer that will meet a particular specification. The method may further include a feedback loop to dynamically update the model.

In accordance with another embodiment in accordance with the present invention, an article of manufacture including a computer readable medium having instructions stored thereon that, responsive to execution by an electronic system, cause the electronic system to perform operations including collecting sample test information from a plurality of test-only structures, prior to completion of the first wafer, gathering finished test data from all die of the first wafer, after completion of the first wafer, constructing a yield prediction model based on the sample test information and on the finished test data, and predicting, using the model, a percentage of die of the first wafer that will meet a particular specification.

In a further embodiment in accordance with the present invention, an apparatus includes means for collecting sample test information from a plurality of test-only structures, prior to completion of the first wafer, means for gathering finished test data from all die of the first wafer, after completion of the first wafer, means for constructing a yield prediction model based on the sample test information and on the finished test data and means for predicting, using the model, a percentage of die of the first wafer that will meet a particular specification.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

FIG. 2 illustrates an exemplary regression data set, in accordance with embodiments of the present invention.

DETAILED DESCRIPTION

Figure 1:
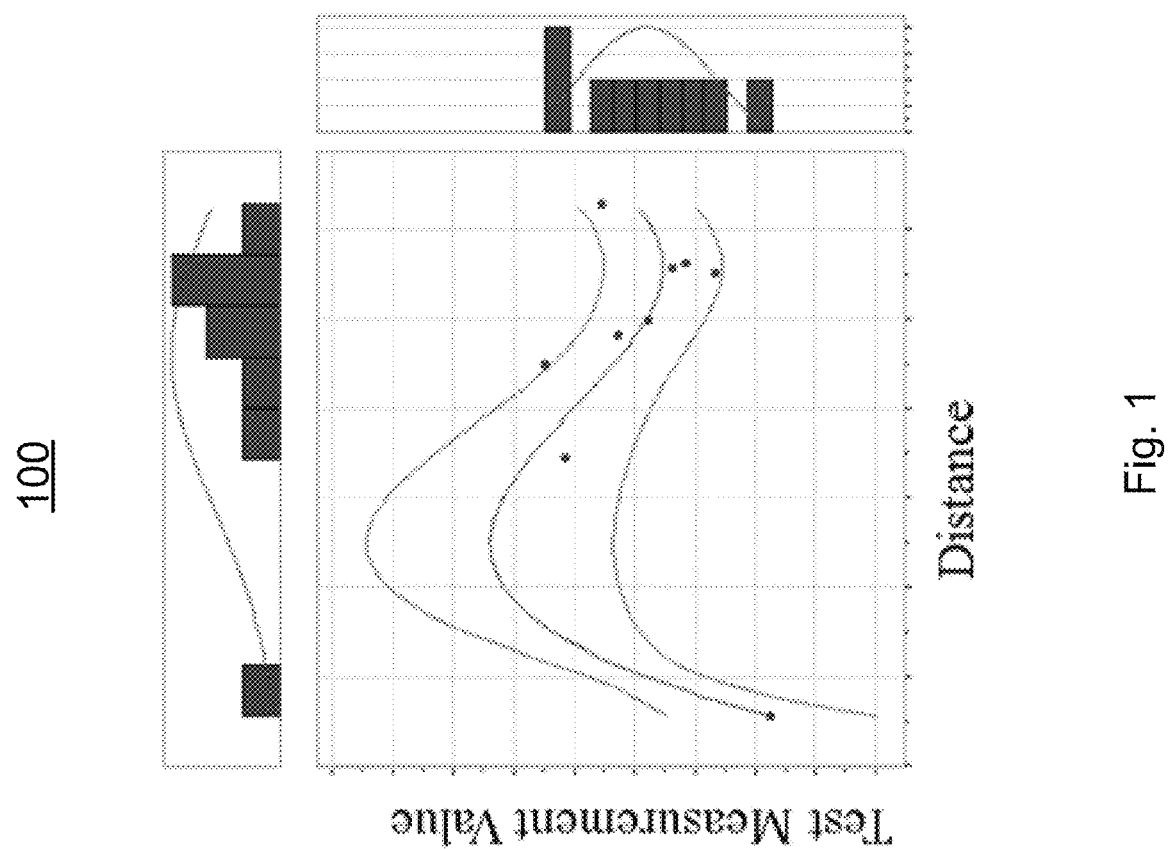
FIG. 1 illustrates an exemplary nine-site cross section of wafer testing measurements, in accordance with embodiments of the present invention.

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Notation and Nomenclature

Some portions of the detailed descriptions which follow (e.g., method 300) are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "comparing" or "setting" or "accessing" or "placing" or "testing" or "forming" or "mounting" or "removing" or "ceasing" or "stopping" or "coating" or "attaching" or "processing" or "performing" or "generating" or "adjusting" or "creating" or "executing" or "continuing" or "indexing" or "computing" or "translating" or "calculating" or "measuring" or "gathering" or "running" or the like, refer to the action and processes of, or under the control of, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "kernel" is used herein in a manner consistent with its use by those of ordinary skill in the mathematical arts, as opposed to its use in the computer programming arts.

Dynamic Yield Prediction

A process to dynamically predict yield begins after initial layers of metallization have been applied to a wafer, e.g., a subset of the total number of metal layers, but before any subsequent metal layers are produced. This stage of production may be known as or referred to as "inter-metallic wafer acceptance testing." Test structures may include, without limitation, individual single transistors. A variety of parameters, including, for example, transistor saturation current ($I_{dsat}$) and off-state current ($I_{off}$), are measured at a number of test structures on such a partially completed wafer. The test structures are typically formed in scribe lines of the wafer, although that is not required. It is appreciated that this testing is not necessarily a full circuit probe test. In accordance with embodiments of the present invention, it is not necessary to probe each individual die, or all test sites of a wafer.

To initiate a process of dynamic yield prediction, a number of wafers are tested for transistor performance and leakage characteristics at the "inter-metallic wafer acceptance testing" stage, for example, after only one metal layer has been laid down. These results are stored until the wafer production is completed. After production is completed, each die on a completed wafer is tested for its finished die level leakage, $I_{DDQ}$, and performance using one or more ring oscillators within each die, referred to as "speed" or "speedo." A model is derived to accurately represent the relationship between the inter-metallic wafer acceptance test results and the corresponding finished circuit probe test results.

Based on process characteristics of the resulting individual transistor and finished die level performance and leakage, it has been determined that a particular semiconductor manufacturing process is generally concentric in nature. For example, die in the center of a wafer tend to operate slower than die nearer the edges of a wafer. In addition, die in the upper left corner of the wafer will exhibit the same or similar transistor performance and leakage as die in the upper right corner, or as die in the lower left corner and so on. Further, the fastest die tend to be concentrated in a ring several die wide and near, but not quite at the edge of a wafer.

In accordance with embodiments of the present invention, as few as nine site measurements, e.g., single transistor performance measurements, may be used to characterize a cross section of a wafer, from the center to the edge. Such a profile may then be swept through 360 degrees around the wafer to properly extrapolate the entire wafer, based on the concentric nature of the wafer. Accordingly, the performance distribution of all die on a wafer, for example, how many die will meet a particular specification, typically counted in the hundreds, may be predicted based on testing nine test structures at the inter-metallic wafer acceptance test stage. These measurements are encoded, normalized and optionally weighted as features based on their radial distance from the center of a wafer.

The input feature space is minimized to prevent overfitting and increase model generation performance by identifying the inter-metallic wafer acceptance test structures which most accurately predict the corresponding circuit probe test results FIG. 1 illustrates an exemplary nine-site cross section 100 of wafer testing measurements, in accordance with embodiments of the present invention. The vertical axis is a normalized inter-metallic wafer acceptance test measurement, such as transistor saturation current ($I_{dsat}$). The horizontal axis is distance from the wafer center.

It is to be appreciated that exemplary cross section 100 may be accurately represented with a polynomial kernel of degree three. The optimum degree is determined based on the number of inflection points exhibited in the cross-section of a wafer in a given technology node. Based on the process characteristics of a technology node, this kernel type may change and must be determined and validated for accuracy for each process node. A validation process must be used to determine that the kernel function does provide the minimal error term, and the resulting prediction accuracy is sufficient to accurately predict yield. It is to be appreciated that different manufacturing processes, e.g., different process nodes, may be accurately represented with polynomial kernels of different degrees.

A prediction model is formed by combining statistical regression with the custom kernel, the input feature space, and the resulting die level measurement $I_{DDQ}$, and/or speed. FIG. 2 illustrates an exemplary regression data set 200, in accordance with embodiments of the present invention.

In data set 200, each y is the measured result of an unknown function $F(\vec{x})$, and random error, e.g., $\vec{y_i}=F(\vec{x_i})+b_i$ where b is a random variable that models the noise. After injecting the properly encoded feature space and kernel function, the error is minimized, resulting in an accurate model. The model can exist in a single form where x is the entire feature space and y represents the resulting die level performance, or it can be decomposed into a series of models, equivalent to its single form. For the exemplary data set of FIG. 2, the kernel function is given by Relation 1, below:

$$Y=a+bX-cX^2+dX^3 \hspace{2cm} \text{(Relation 1)}$$

where X is the distance of the test site from the wafer center.

Subsequent wafers are tested at the inter-metallic wafer acceptance test stage. Based on the model developed and inter-metallic wafer acceptance measurements of subsequent wafers, finished yield is predicted. Such a prediction may occur, for example, three to six weeks prior to wafer completion, and prior to circuit probe testing.

In order to improve the prediction model, the inter-metallic wafer acceptance test results, and corresponding yield predictions, may be compared with final test results to iteratively and dynamically improve the model.

In this novel manner, embodiments in accordance with the present invention accurately predict process yield prior to wafer completion, and account for process target drift, and/or changes in process variation.

Figure 3:
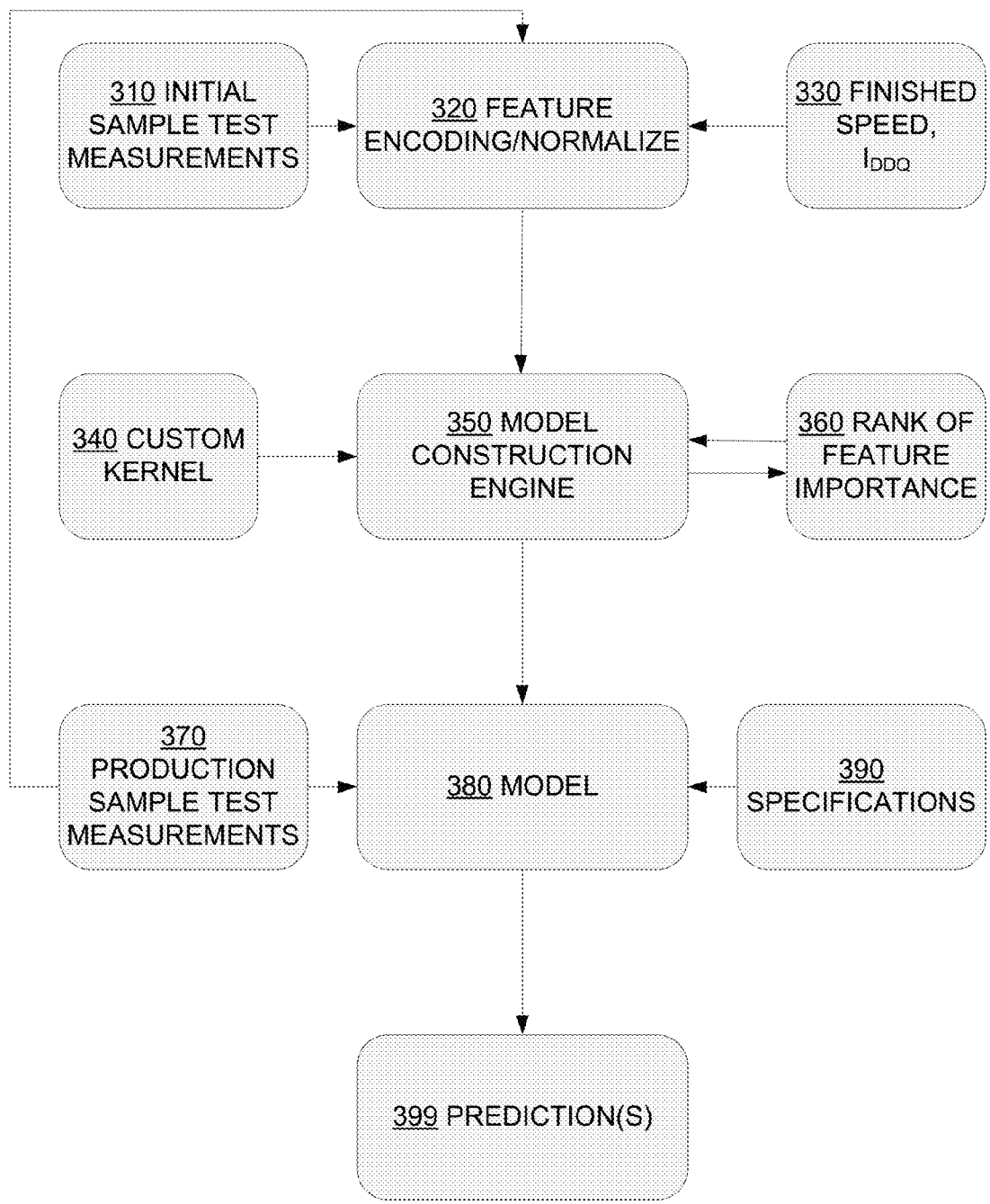
FIG. 3 illustrates an exemplary data flow diagram 300 illustrating a computer-implemented method of dynamic yield prediction, in accordance with embodiments of the present invention.

FIG. 3 illustrates an exemplary data flow diagram 300 illustrating a computer-implemented method of dynamic yield prediction, in accordance with embodiments of the present invention. Such method(s) may operate on any suitable computer system, and may be stored on any suitable computer readable media. Item 330 is finished test measurement data, e.g., speed and/or $I_{DDQ}$, taken on finished wafers, e.g., at circuit probe testing. This is the data that the model 380 will ultimately predict. However, as previously presented, in order to create the model, at least a first set of finished data is required.

Item 310 is sample data taken at the inter-metallic wafer acceptance testing stage. As previously presented, this is the data that will drive subsequent predictions. However, at this stage, the data is primarily used to create the prediction model. At 320, the features, e.g., the physical location of the test structures and their corresponding test data, are encoded, normalized and optionally weighted. Features such as distance are used to encode the subset of test structure site location within the wafer using, for example, distance from the wafer center, to represent a cross section appearance where the measurements appear to be located upon on single radius, even though they the actual measurements are scattered across the wafer.

Item 340 is the custom kernel, previously described with respect to FIGS. 1 and 2. Item 350 is a process of developing a prediction model, as previously presented with respect to FIGS. 1 and 2. It is appreciated that embodiments in accordance with the present invention are not limited to using only single transistor performance measurements, and that any suitable performance measurement may be utilized. Item 360, feature ranking of importance, allows for the invention to accept input of any and all additional types of test structure measurements which may exist, such as transistor array performance measurements and/or RAM based performance structures. Ranking these additional inputs or "features," embodiments in accordance with the present invention may select measurements or "features" of highest importance with respect to model accuracy and minimize the error term in predicting the finished die level leakage and die performance "speed," eliminating test site measurements which are less important in order to minimize the risk of potential overfitting of the model.

Item 370 is sample data taken at the inter-metallic wafer acceptance testing stage on production wafers. This data is used by the prediction model to form a prediction of yield from an entire wafer, or batch of wafers. This production sample test information may replace the initial sample test information 310 as feedback in subsequent model refinement. Item 390 is the specification(s) that define the yield of the wafer. It is appreciated that item 390 may include multiple specifications, e.g., "bins." For example, a first bin may include die meeting a high speed specification. A second bin may include die that are functional, do not meet the high speed specification, but only meet a lower speed specification. Embodiments in accordance with the preset invention are well suited to predicting multi-level specifications, e.g., sorting die into a plurality of "bins" according to a variety of specifications.

Item 380 is the yield prediction model, constructed at 350, and previously described in FIGS. 1 and 2. Yield prediction model 380 accesses sample test measurements, e.g., production sample test measurements 370 and specifications 390, to predict 399 a number of die from a wafer or batch of wafers that will meet specifications 390.

A yield prediction process may be made dynamic by feeding back production sample test measurements 370 and finished test results 330 (from the same wafers as the 370 wafers) into model construction engine 350. In effect, production sample test measurements 370 replace initial sample test measurements 310 in iterative feedback. In this novel manner, the model 380 is updated to reflect current process maturity.

Embodiments in accordance with the present invention provide systems and methods for dynamic yield prediction(s). In addition, embodiments in accordance with the present invention provide systems and methods for dynamic yield predictions that account for current process maturity. Further, embodiments in accordance with the present invention provide systems and methods for dynamic yield predictions that are compatible and complementary with existing systems and methods of electronic device design, manufacture and test.

Various embodiments of the invention are thus described. While the present invention has been described in particular embodiments, it should be appreciated that the invention should not be construed as limited by such embodiments, but rather construed according to the below claims.

What is claimed is:

1. A computer-implemented method comprising:
collecting sample test information from a plurality of test-only structures of a first wafer, prior to completion of said first wafer;
gathering finished test data from all die of said first wafer, after completion of said first wafer;
constructing a yield prediction model based on said sample test information and on said finished test data; and
predicting, using said model, a percentage of die of said first wafer that will meet a particular specification.

2. The computer-implemented method of claim 1 further comprising:
collecting second sample test information from a plurality of test-only structures of a second wafer, prior to completion of said second wafer; and
predicting, using said model, a percentage of die of said second wafer that will meet a particular specification.

3. The computer-implemented method of claim 2 further comprising:
gathering second finished test data from all die of said second wafer, after completion of said second wafer; and
constructing a refined yield prediction model based on said second sample test information and on said second finished test data.

4. The computer-implemented method of claim 3 wherein said refined yield prediction model is adjusted to reflect current process maturity.

5. The computer-implemented method of claim 1 wherein said plurality of test-only structures is limited to nine or fewer of said test-only structures.

6. The computer-implemented method of claim 1 wherein said collecting is performed after production of a second metallization layer and prior to production of any subsequent metallization.

7. The computer-implemented method of claim 1 wherein said test-only structures comprise an inter-metallic wafer acceptance test transistor formed in a scribe line of said first wafer.

8. An article of manufacture including a computer readable medium having instructions stored thereon that, responsive to execution by an electronic system, cause said electronic system to perform operations comprising:
collecting sample test information from a plurality of test-only structures of a first wafer, prior to completion of said first wafer;
gathering finished test data from all die of said first wafer, after completion of said first wafer;
constructing a yield prediction model based on said sample test information and on said finished test data; and
predicting, using said model, a percentage of die of said first wafer that will meet a particular specification.

9. The article of manufacture of claim 8 further comprising:
collecting second sample test information from a plurality of test-only structures of a second wafer, prior to completion of said second wafer; and
predicting, using said model, a percentage of die of said second wafer that will meet a particular specification.

10. The article of manufacture of claim 9 further comprising:
gathering second finished test data from all die of said second wafer, after completion of said second wafer; and
constructing a refined yield prediction model based on said second sample test information and on said second finished test data.

11. The article of manufacture of claim 10 wherein said refined yield prediction model is adjusted for changes in process variation.

12. The article of manufacture of claim 8 wherein said plurality of test-only structures is limited to nine or fewer of said test-only structures.

13. The article of manufacture of claim 8 wherein said collecting is performed after production of a second metallization layer and prior to production of any subsequent metallization.

14. The article of manufacture of claim 8 wherein said test-only structures comprise a ring oscillator formed in a scribe line of said first wafer.

15. An apparatus comprising:
means for collecting sample test information from a plurality of test-only structures of a first wafer, prior to completion of said first wafer;
means for gathering finished test data from all die of said first wafer, after completion of said first wafer;
means for constructing a yield prediction model based on said sample test information and on said finished test data; and
means for predicting, using said model, a percentage of die of said first wafer that will meet a particular specification.

16. The apparatus of claim 15 further comprising:
means for collecting second sample test information from a plurality of test-only structures of a second wafer, prior to completion of said second wafer; and
means for predicting, using said model, a percentage of die of said second wafer that will meet a particular specification.

17. The apparatus of claim 16 further comprising:
means for gathering second finished test data from all die of said second wafer, after completion of said second wafer; and
means for constructing a refined yield prediction model based on said second sample test information and on said second finished test data.

18. The apparatus of claim 17 wherein said refined yield prediction model is adjusted to reflect current process maturity.

19. The apparatus of claim 15 wherein said plurality of test-only structures is limited to nine or fewer of said test-only structures.

20. The apparatus of claim 15 wherein said means for collecting further comprises means for collecting said sample test information from a plurality of test-only structures after production of a second metallization layer and prior to production of any subsequent metallization.

* * * * *